US009794803B2

United States Patent
Lin et al.

(10) Patent No.: US 9,794,803 B2
(45) Date of Patent: Oct. 17, 2017

(54) SYSTEM AND METHODS OF DYNAMIC TDD CONFIGURATIONS

(71) Applicant: MEDIATEK, INC., Hsin-Chu (TW)

(72) Inventors: Shiang-Jiun Lin, Hsinchu (TW); Chien-Hwa Hwang, Hsinchu (TW); Xiangyang Zhuang, Lake Zurich, IL (US)

(73) Assignee: MEDIATEK INC. (TW)

( * ) Notice: Subject to any disclaimer, the term of this patent is extended or adjusted under 35 U.S.C. 154(b) by 443 days.

(21) Appl. No.: 14/157,212

(22) Filed: Jan. 16, 2014

(65) Prior Publication Data

US 2014/0204783 A1    Jul. 24, 2014

Related U.S. Application Data

(60) Provisional application No. 61/754,201, filed on Jan. 18, 2013.

(51) Int. Cl.
*H04W 24/02* (2009.01)
*H04L 5/14* (2006.01)
(Continued)

(52) U.S. Cl.
CPC .......... *H04W 24/02* (2013.01); *H04L 1/1854* (2013.01); *H04L 5/1438* (2013.01);
(Continued)

(58) Field of Classification Search
CPC ... H04L 5/1469; H04L 1/1854; H04L 5/1438; H04L 1/1825; H04W 72/042;
(Continued)

(56) References Cited

U.S. PATENT DOCUMENTS

2011/0211503 A1   9/2011  Che et al. ............... 370/280
2012/0320806 A1  12/2012  Ji et al. ................... 370/280
(Continued)

FOREIGN PATENT DOCUMENTS

CN    102832989 A    12/2012
CN    102843732 A    12/2012
(Continued)

OTHER PUBLICATIONS

EPO, Search Report for the EP patent application 14740544.3 dated Oct. 29, 2015 (17 pages).
(Continued)

*Primary Examiner* — Michael Thier
*Assistant Examiner* — Rownak Islam
(74) *Attorney, Agent, or Firm* — Imperium Patent Works; Zheng Jin

(57) ABSTRACT

Solutions to support the coexistence of legacy UEs and new released UEs in adaptive TDD systems are proposed. Methods of TDD grouping, RACH (random access channel) resource allocation, and DL/UL data transmission and HARQ (Hybrid Automatic Repeat Request) process to serve legacy UEs without interfering the operation of new released UEs are proposed. With the methods proposed in this invention, both the legacy UEs and the new released UEs can be served in the adaptive TDD systems and the data transmission from the legacy UEs would not interfere the data reception of the new released UEs.

19 Claims, 12 Drawing Sheets

TDD GROUPING, SIB1 BROADCASTING, AND TDD CONFIG CHANGE

(51) Int. Cl.
  H04W 72/04 (2009.01)
  H04L 1/18 (2006.01)
  H04W 72/12 (2009.01)
  H04W 74/00 (2009.01)
  H04W 48/12 (2009.01)

(52) U.S. Cl.
  CPC ......... *H04L 5/1469* (2013.01); *H04W 72/048* (2013.01); *H04L 1/1825* (2013.01); *H04W 48/12* (2013.01); *H04W 72/1289* (2013.01); *H04W 74/006* (2013.01)

(58) Field of Classification Search
  CPC ........... H04W 72/048; H04W 72/1289; H04W 24/02; H04W 74/006; H04W 48/12; H04W 72/04
  USPC .................................................. 370/280, 252
  See application file for complete search history.

(56) References Cited

U.S. PATENT DOCUMENTS

| | | | | |
|---|---|---|---|---|
| 2013/0044652 | A1* | 2/2013 | Wang | H04L 1/08 370/280 |
| 2013/0155915 | A1* | 6/2013 | Park | H04L 5/001 370/280 |
| 2014/0010128 | A1* | 1/2014 | He | H04W 4/06 370/280 |
| 2014/0056185 | A1 | 2/2014 | Yu | 370/280 |
| 2014/0086112 | A1* | 3/2014 | Stern-Berkowitz | H04W 72/1289 370/280 |
| 2014/0098721 | A1 | 4/2014 | Chen et al. | 370/280 |
| 2014/0105077 | A1 | 4/2014 | Chen | 370/280 |
| 2014/0119261 | A1* | 5/2014 | Wang | H04W 72/04 370/312 |
| 2015/0282036 | A1* | 10/2015 | Yi | H04L 5/001 370/332 |

FOREIGN PATENT DOCUMENTS

| | | |
|---|---|---|
| WO | WO2012106840 A1 | 8/2012 |
| WO | WO2012122919 A1 | 9/2012 |

OTHER PUBLICATIONS

3GPP TSG-RAN WG1 Meeting #69 R1-122363, Renesas Mobile Europe Ltd., Discussion on Enhancements for Dynamic TDD UL-DL Configuration, Prague, Czech Republic dated May 21-25, 2012 (4 pages).

3GPP TS 36.211 V11.1.0 (Dec. 2012), 3rd Generation Partnership Project; technical Specification Group Radio access Network; Evolved Universal terrestrial Radio Access (E-UTRA); Physical Channels and Modulation (Release 11) *sections 4 2, 5.7.1*, *tables 4.2-2*, *table 5.7.1-4*.

International Search Report and Written Opinion of International Search Authority for PCT/CN2014/070797 dated Apr. 30,2014 (13 pages).

* cited by examiner

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms | D | S | U | U | U | D | S | U | U | D |

501

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |

TDD GROUP #1-1

502

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 6 | 5ms | D | S | U | U | U | D | S | U | U | D |

TDD GROUP #1-2

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |

TDD GROUP #2-1

602

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 1 | 5ms | D | S | U | U | D | D | S | U | U | D |
| 2 | 5ms | D | S | U | D | D | D | S | U | D | D |
| 6 | 5ms | D | S | U | U | U | D | S | U | U | D |

TDD GROUP #2-2

603

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |

TDD GROUP #2-3

FIG. 6

TDD GROUPING, SIB1 BROADCASTING, AND TDD CONFIG CHANGE

| UL-DL CONFIG | SWITCH POINT PERIODICITY | SUBFRAME NUMBER ||||||||||
|---|---|---|---|---|---|---|---|---|---|---|---|
| | | 0 | 1 | 2 | 3 | 4 | 5 | 6 | 7 | 8 | 9 |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |

TDD GROUP #1-1

| UL-DL CONFIG | SWITCH POINT PERIODICITY | SUBFRAME NUMBER ||||||||||
|---|---|---|---|---|---|---|---|---|---|---|---|
| | | 0 | 1 | 2 | 3 | 4 | 5 | 6 | 7 | 8 | 9 |
| 0 | 5ms | D | S | U | U | U | D | S | U | U | U |
| 1 | 5ms | D | S | U | U | D | D | S | U | U | D |
| 2 | 5ms | D | S | U | D | D | D | S | U | D | D |
| 6 | 5ms | D | S | U | U | U | D | S | U | D | D |

TDD GROUP #1-2

RESTRICTION ON RACH RESOURCE CONFIGURATION

TDD AND RACH RESOURCE CONFIGURATION EXTENSION IN SIB

DL DATA TRANSMISSION/RETRANSMISSION

| UL-DL CONFIG | SUBFRAME NUMBER ||||||||||
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

HARQ TIMING – DL ASSOCIATION SET INDEX K FOR TDD

1120

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 3 | 10ms | ~~D~~ | S | U(1,5,6) | U(7,8) | U(0,9) | D | D | ~~D~~ | ~~D~~ | ~~D~~ |
| 4 | 10ms | D | S | U(0,1,4,5) | U(6,7,8,9) | D | D | D | D | D | D |
| 5 | 10ms | D | S | U(0,1,2,3,4,5,6,7,8,9) | D | D | D | D | D | D | D |

TDD GROUP #1-1

1130

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | ~~D~~ | S | U(6) | U | U(0) | ~~D~~ | S | U(1) | U | U(5) |
| 1 | 5ms | D | S | U(5,6) | U(9) | D | D | S | U(0,1) | U(4) | D |
| 2 | 5ms | D | S | U(4,5,6,8) | D | D | D | S | U(9,0,1,3) | D | D |
| 6 | 5ms | D | S | U(5) | U(6) | U(9) | D | S | U(0) | U(1) | D |

TDD GROUP #1-2

DL DATA TRANSMISSION/RETRANSMISSION

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 1 | 5ms | D | S | U(5,6) | U(9) | D | D | S | U(0,1) | U(4) | D |
| 2 | 5ms | D | S | U(4,5,6,8) | D | D | D | S | U(9,0,1,3) | D | D |
| 6 | 5ms | D | ~~S~~ | U(5) | U(6) | U(9) | D | ~~S~~ | U(0) | U(1) | ~~D~~ |

TDD GROUP #2-2

1150

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U(6) | U | U(0) | D | S | U(1) | U | U(5) |

TDD GROUP #2-3

DL DATA TRANSMISSION/RETRANSMISSION

FIG. 11D

UL DATA TRANSMISSION/RETRANSMISSION

| UL-DL CONFIG | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | - | - | - | 4 | 6 | - | - | - |
| 1 | - | 6 | - | - | 4 | - | 6 | - | - | 4 |
| 2 | - | - | - | 4 | - | - | - | - | 4 | - |
| 3 | 4 | - | - | - | - | - | - | - | 4 | 4 |
| 4 | - | - | - | - | - | - | - | - | 4 | 4 |
| 5 | - | - | - | - | - | - | - | - | 4 | - |
| 6 | 7 | 7 | - | - | - | 7 | 7 | - | - | 5 |

UL GRANT FOR UL TRANSMISSION/RETRANSMISSION

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 3 | 10ms | ~~D~~ | S | U(8) | U(9) | U(0) | D | D | D | D | ~~D~~ |
| 4 | 10ms | D | S | U(8) | U(9) | D | D | D | D | D | D |
| 5 | 10ms | D | S | U(8) | D | D | D | D | D | D | D |

TDD GROUP #1-1

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | ~~D~~ | S | U(6) | U | U(0) | ~~D~~ | S | U(1) | U | U(5) |
| 1 | 5ms | D | S | U(6) | U(9) | D | D | S | U(1) | U(4) | D |
| 2 | 5ms | D | S | U(8) | D | D | D | S | U(3) | D | D |
| 6 | 5ms | D | S | U(5) | U(6) | U(9) | D | S | U(0) | U(1) | D |

TDD GROUP #1-2

UL DATA TRANSMISSION/RETRANSMISSION

FIG. 12C

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 1 | 5ms | D | S | U(6) | U(9) | D | D | S | U(1) | U(4) | D |
| 2 | 5ms | D | S | U(8) | D | D | D | S | U(3) | D | D |
| 6 | 5ms | D | ~~S~~ | U(5) | U(6) | U(9) | D | ~~S~~ | U(0) | U(1) | ~~D~~ |

TDD GROUP #2-2

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D | S | U(6) | U | U(0) | D | S | U(1) | U | U(5) |

TDD GROUP #2-3

UL DATA TRANSMISSION/RETRANSMISSION

FIG. 12D

| UL-DL CONFIG | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | - | - | 4 | 7 | 6 | - | - | 4 | 7 | 6 |
| 1 | - | - | 4 | 6 | - | - | - | 4 | 6 | - |
| 2 | - | - | 6 | - | - | - | - | 6 | - | - |
| 3 | - | - | 6 | 6 | 6 | - | - | - | - | - |
| 4 | - | - | 6 | 6 | - | - | - | - | - | - |
| 5 | - | - | 6 | - | - | - | - | - | - | - |
| 6 | - | - | 4 | 6 | 6 | - | - | 4 | 7 | - |

HARQ TIMING FOR UL DATA TRANSMISSION

FIG. 13A

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 3 | 10ms | D (4) | S | U | U | U | D | D | D | D (2) | D (3) |
| 4 | 10ms | D | S | U | U | D | D | D | D | D (2) | D (3) |
| 5 | 10ms | D | S | U | D | D | D | D | D | D (2) | D |

TDD GROUP #1-1

| UL-DL CONFIG | SWITCH POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms | D(3,4) | S(7) | U | U | U | D(8,9) | S(2) | U | U | U |
| 1 | 5ms | D | S(7) | U | U | D(8) | D | S(2) | U | U | D(3) |
| 2 | 5ms | D | S | U | D(7) | D | D | S | U | D(2) | D |
| 6 | 5ms | D(4) | S(7) | U | U | U | D(8) | S(2) | U | U | D(3) |

TDD GROUP #1-2

HARQ FOR UL DATA TRANSMISSION

FIG. 13B

HARQ FOR UL DATA TRANSMISSION

UL DATA RETRANSMISSION SUPPRESSION

SYSTEM AND METHODS OF DYNAMIC TDD CONFIGURATIONS

CROSS REFERENCE TO RELATED APPLICATIONS

This application claims priority under 35 U.S.C. §119 from U.S. Provisional Application No. 61/754,201, entitled "System and Methods of Dynamic TDD configurations" filed on Jan. 18, 2013, the subject matter of which is incorporated herein by reference.

TECHNICAL FIELD

The present invention relates generally to wireless communication systems and, more particularly, to dynamic Time Division Duplex (TDD) configurations in LTE systems.

BACKGROUND

In wireless communication systems, such as defined by 3GPP Long Term Evolution (LTE/LTE-A) specification, user equipments (UE) and base stations (eNodeB) communicate with each other by sending and receiving data carried in radio signals according to a predefined radio frame format. Typically, the radio frame format contains a sequence of radio frames, each radio frame having the same frame length with the same number of subframes. The subframes are configures to perform uplink (UL) transmission or downlink (DL) reception in different Duplexing methods. Time-division duplex (TDD) is the application of time-division multiplexing to separate transmitting and receiving radio signals. TDD has a strong advantage in the case where there is asymmetry of the uplink and downlink data rates. Seven different TDD configurations are provided in LTE/LTE-A systems to support different DL/UL traffic ratios for different frequency bands.

FIG. 1 (Prior Art) illustrates the TDD mode UL-DL configurations in an LTE/LTE-A system. Table 100 shows that each radio frame contains ten subframes, D indicates a DL subframe, U indicates an UL subframe, and S indicates a Special subframe/Switch point (SP). Each SP contains a DwPTS (Downlink pilot time slot), a GP (Guard Period), and an UpPTS (Uplink pilot time slot). DwPTS is used for normal downlink transmission and UpPTS is used for uplink channel sounding and random access. DwPTS and UpPTS are separated by GP, which is used for switching from DL to UL transmission. The length of GP needs to be large enough to allow the UE to switch to the timing advanced uplink transmission. These allocations can provide 40% to 90% DL subframes. Current UL-DL configuration is broadcasted in the system information block, i.e. SIB1. The semi-static allocation via SIB1, however, may or may not match the instantaneous traffic situation. Currently, the mechanism for adapting UL-DL allocation is based on the system information change procedure.

In 3GPP LTE Rel-12 and after, the trend of the system design shows the requirements on more flexible configuration in the network system. Based on the system load, traffic type, traffic pattern and so on, the system can dynamically adjust its parameters to further utilize the radio resource and to save the energy. One example is the support of dynamic TDD configuration, where the TDD configuration in the system may dynamically change according to the DL-UL traffic ratio. When the change better matches the instantaneous traffic situation, the system throughput will be enhanced. For example, in one scenario, multiple indoor Femto cells deployed on the same carrier frequency and multiple Macro cells deployed on an adjacent carrier frequency where all Macro cells have the same UL-DL configuration and the indoor Femto cells can adjust UL-DL configuration. In another scenario, multiple outdoor Pico cells deployed on the same carrier frequency and multiple Macro cells deployed on an adjacent carrier frequency where all Macro cells have the same UL-DL configuration and the outdoor Pico cells can adjust UL-DL configuration.

FIG. 2 (Prior Art) illustrates an LTE/LTE-A mobile communication system 200 with adaptive TDD configuration. Mobile communication system 200 comprises a Macro base station eNB 201 serving Macro cell 1, base station eNB 202 serving small cell 2, and base station eNB 203 serving small cell 3. Cell 1 is a Macro cell and its TDD configuration is more static. Small Cells 2-3 are within the macro cell's coverage. Cell 2 and Cell 3 form an isolated cell cluster 1, where TDD configuration can be independently adjusted. All cells in an isolated cell cluster should apply the TDD configuration change together. In this example, assume cell 1 applies TDD configuration 5, which is configured semi-statically, and the isolated cell cluster, i.e. cell 2 and cell 3, originally applies TDD configuration 5. As more UL traffic is demanded in the isolated cluster, it changes the TDD configuration to TDD configuration 3.

The notification of TDD change in an adaptive TDD system may be sent through a dedicated signaling, i.e., RRC (Radio Resource Control), MAC (Media Access Control), or PDCCH (Physical Downlink Control Channel) signaling. One reason to adopt TDD configuration change by dedicated signaling is that it can be adjusted more efficiently and frequently to match the instantaneous traffic pattern. In an adaptive TDD system, however, there may be legacy UEs and new released UEs. If the TDD change is sent through the dedicated signaling, then only new released UEs understand the information. The legacy UEs cannot know the dynamic TDD configuration because they cannot interpret the new information element. As a result, the legacy UEs may interfere with the operation of other UEs. For example, a legacy UE3 may perform random access in its cognitive UL subframe, but the subframe is operated for DL transmission due to the TDD configuration change.

A solution is sought.

SUMMARY

Solutions to support the coexistence of legacy UEs and new released UEs in adaptive TDD systems are proposed. Methods of TDD grouping, RACH (random access channel) resource allocation, and DL/UL data transmission and HARQ (Hybrid Automatic Repeat Request) process to serve legacy UEs without interfering the operation of new released UEs are proposed. With the methods proposed in this invention, both the legacy UEs and the new released UEs can be served in the adaptive TDD systems and the data transmission from the legacy UEs would not interfere the data reception of the new released UEs.

In a first solution, TDD grouping methods, TDD adaptation within a TDD group, and TDD adaptation across TDD groups for the operation of a dynamic TDD system are proposed. In one embodiment, an eNB configures TDD groups and broadcasts TDD group information and a TDD reference configuration to UEs. A TDD group contains multiple TDD configurations that have common subframes no less than subframes #0, #1, #2 and #5. The TDD reference configuration belongs to the TDD group and has the most common uplink (UL) subframes as compared to other TDD configurations in the TDD group.

In a second solution, since the legacy UEs' cognition on DL/UL operation in a subframe may be different from real operation in a dynamic TDD system, the PRACH resource configuration and the random access procedure for the legacy UEs are proposed. In one embodiment, PRACH resource allocation is restricted to subframes that are commonly used as UL operation in a TDD group. In another embodiment, TDD configuration and PRACH resource configuration are extended in SIB1 and SIB2 to serve both legacy UEs and new released UEs so that PRACH resource allocation is not limited.

In a third solution, methods of DL/UL data transmission scheduling and the associated HARQ for DL/UL data transmission scheduling for the legacy UEs are proposed. For DL data transmission, eNB should schedule DL transmission or retransmission in a DL subframe where its corresponding HARQ feedback should be transmitted in a common UL subframe. For UL data transmission, eNB should allocate UL grant in a DL subframe where the UL data should be transmitted in a common UL subframe. For HARQ feedback for UL data transmission, the DL subframes used to transmit the HARQ feedback should be common DL subframes. Finally, eNB can suppress UL retransmission so that it does not happen in inconsistent subframes.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 illustrates a first embodiment of TDD grouping in an adaptive TDD system.

FIG. 6 illustrates a second embodiment of TDD grouping in an adaptive TDD system.

FIG. 11C illustrates one embodiment of DL data transmission in an adaptive TDD system.

FIG. 11D illustrates another embodiment of DL data transmission in an adaptive TDD system.

FIG. 12C illustrates one embodiment of UL data transmission or retransmission in an adaptive TDD system.

FIG. 12D illustrates another embodiment of UL data transmission or retransmission in an adaptive TDD system.

FIG. 13A illustrates the timing of HARQ feedback for UL data transmission.

FIG. 13B illustrates one embodiment of HARQ scheduling for UL transmission in an adaptive TDD system.

DETAILED DESCRIPTION

Reference will now be made in detail to some embodiments of the invention, examples of which are illustrated in the accompanying drawings.

Figures 1, 2:
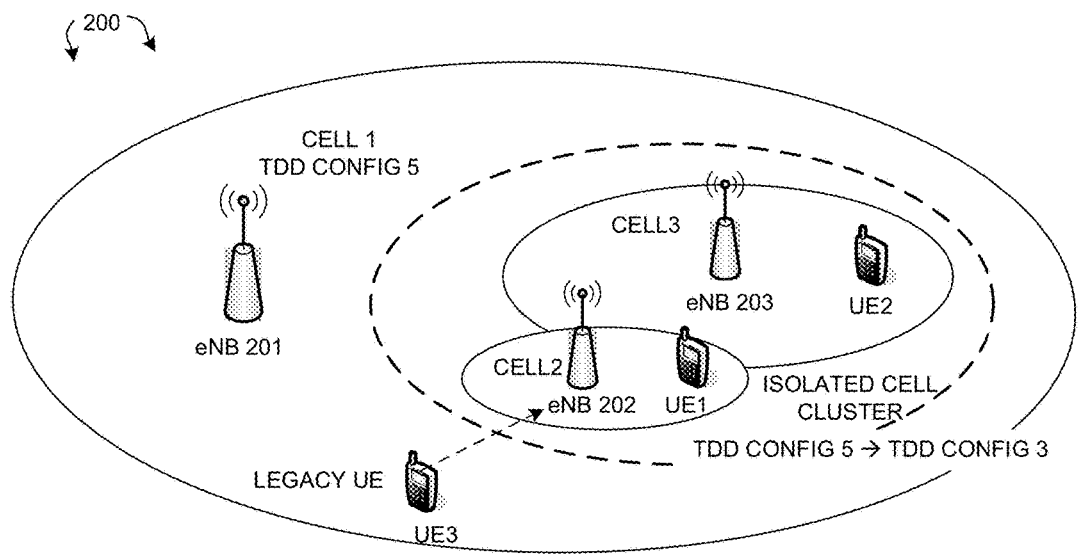
FIG. 1 (Prior Art) illustrates the TDD mode UL-DL configurations in an LTE/LTE-A system.
FIG. 2 (Prior Art) illustrates an LTE/LTE-A mobile communication system with adaptive TDD configuration.
Figure 3:
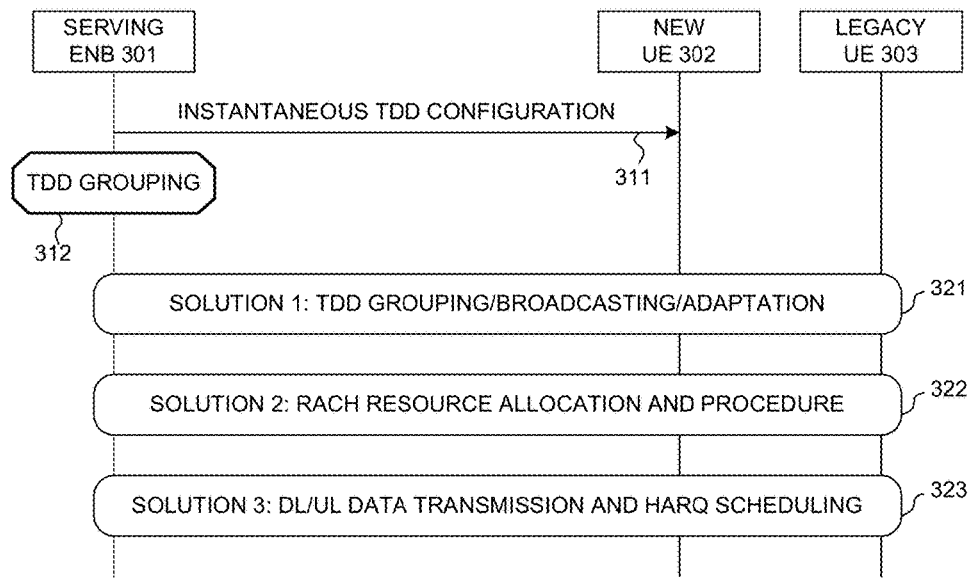
FIG. 3 illustrates an LTE/LTE-A mobile communication system with adaptive TDD configuration in accordance with one novel aspect.

FIG. 3 illustrates a Long Term Evolution LTE/LTE-A mobile communication system 300 with adaptive TDD configuration in accordance with one novel aspect. Mobile communication system 300 comprises a serving base station eNB 301, a new released UE 302, and a legacy UE 303. In one example, UE 302 is a UE released in/after LTE Rel-12, and UE 303 is a UE released before LTE Rel-12. Starting from LTE Rel-12, adaptive Time Division Duplex (TDD) transmission mode is supported, where the TDD configuration in the system may dynamically change according to the downlink-uplink traffic ratio to better match the instantaneous traffic situation and thereby enhancing the system throughput.

The notification of TDD change in an adaptive TDD system may be sent through dedicated signaling, i.e., RRC (Radio Resource Control), MAC (Media Access Control), or PDCCH (Physical Downlink Control Channel) signaling. One reason to adopt TDD configuration change by dedicated signaling is that it can be adjusted more efficiently and frequently to match the instantaneous traffic pattern. In an adaptive TDD system, however, there may be legacy UEs and new released UEs. If the TDD change is sent through the dedicated signaling, then only new released UEs understand the information. The legacy UEs cannot know the dynamic TDD configuration because they cannot interpret the new information element. The present application proposes solutions for coexistence of legacy UEs and new released UEs in such adaptive TDD system.

In step 311, the serving eNB 301 sends an instantaneous TDD configuration to new released UE 302 via dedicated signaling. Based on the instantaneous TDD configuration, UE 302 knows the exact DL/UL operation in each subframe, so that all subframes can be used to serve UE 302. On the other hand, legacy UE 303's knowledge on the DL/UL operation in each subframe may be different from the real DL/UL operation, thus only the common subframes can be used to serve UE 303. To observe the TDD configurations, some subframes are common in certain TDD configurations, which may be possible to be used to serve the legacy UEs.

A common subframe or a fixed subframe means no matter how TDD configuration changes, the DL, SP, or UL operation in such subframe will not be changed. For example, subframes SF#0, #1, #2, and #5 are common in all TDD configurations.

In one novel aspect, to obtain more subframes in common, TDD configurations are partitioned into different TDD groups. In step 312, eNB 301 determines TDD grouping. Based on the TDD grouping, various solutions are provided to facilitate the coexistence of new released UE 302 and legacy UE 303. In a first solution (step 321), different TDD grouping methods, TDD adaptation within a TDD group, and TDD adaptation across TDD groups for the operation of a dynamic TDD system are proposed. In a second solution (step 322), since the legacy UEs' cognition on DL/UL operation in a subframe may be different from real operation in a dynamic TDD system, the PRACH resource configuration and the random access procedure for the legacy UEs are proposed. In a third solution (step 323), methods of DL/UL data transmission scheduling and the associated HARQ for DL/UL data transmission scheduling for the legacy UEs are proposed. With the methods proposed in this invention, both legacy UEs and new released UEs can be served in the adaptive TDD systems and data transmission from the legacy UEs would not interfere that of the data reception of the new released UEs.

Figure 4:
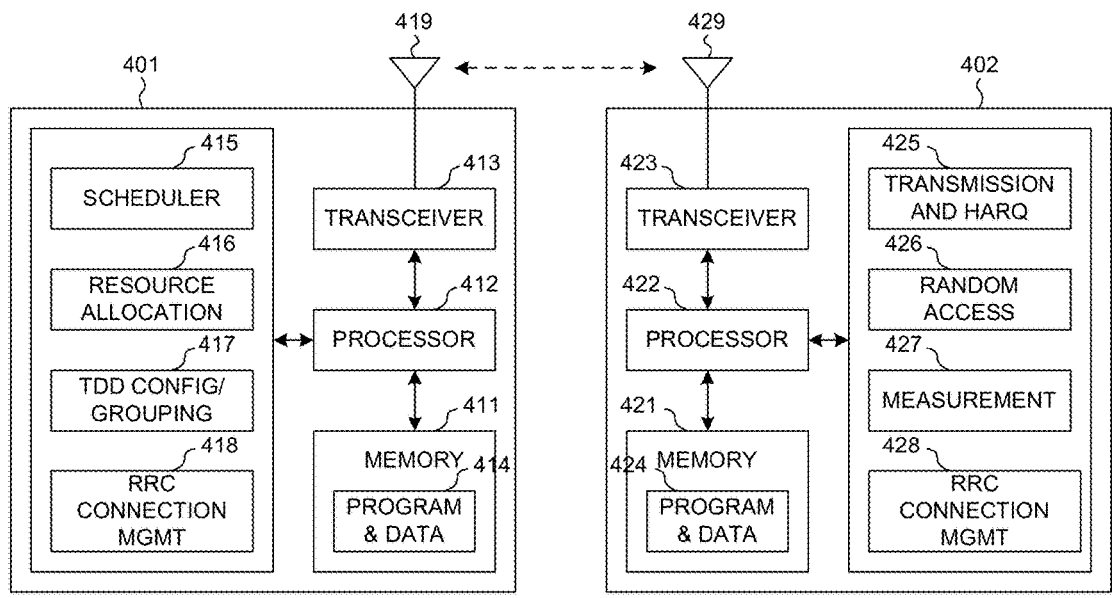
FIG. 4 is a simplified block diagram of a user equipment and a base station with adaptive TDD in accordance with one novel aspect.

FIG. 4 is a simplified block diagram of a base station eNB 401 and a user equipment UE 402 with adaptive TDD in accordance with one novel aspect. Base station eNB 401 comprises memory 411, a processor 412, an RF transceiver 413, and an antenna 419. RF transceiver 413, coupled with antenna 419, receives RF signals from antenna 419, converts them to baseband signals and sends them to processor 412. RF transceiver 413 also converts received baseband signals from processor 412, converts them to RF signals, and sends out to antenna 419. Processor 412 processes the received baseband signals and invokes different functional modules to perform features in eNB 401. Memory 411 stores program instructions and data 414 to control the operations of eNB 401. The program instructions and data 414, when executed by processor 412, enables eNB 401 to providing TDD information and performing various functions accordingly.

Similarly, UE 402 comprises memory 421, a processor 422, an RF transceiver 423, and an antenna 429. RF transceiver 423, coupled with antenna 429, receives RF signals from antenna 429, converts them to baseband signals and sends them to processor 422. RF transceiver 413 also converts received baseband signals from processor 422, converts them to RF signals, and sends out to antenna 429. Processor 422 processes the received baseband signals and invokes different functional modules to perform features in UE 402. Memory 421 stores program instructions and data 424 to control the operations of UE 402. The program instructions and data 424, when executed by processor 422, enables UE 402 to access a mobile communication network for receiving TDD configuration information and performing various functions accordingly.

FIG. 4 also illustrates various function modules in eNB 401 and UE 402. The different components and modules may be implemented in a combination of hardware circuits and firmware/software codes being executable by processors 412 and 422 to perform the desired functions. For example, eNB 401 includes a scheduler 415 that schedules DL and UL transmissions for UE, a resource allocation module 416 that allocates radio resource for UE, a TDD configuration module 417 that determines TDD grouping and configuration, and an RRC connection management module 418 that manages and configures RRC connections. Similarly, UE 402 includes a transmission and HARQ module 425 that performs DL and UL transmission and provides HARQ feedback, a random access module 426 that performs random access procedure, a measurement module 427 that performs radio signal measurements, and an RRC connection management module 428 that performs cell (re)selection and RRC (re)establishment procedures.

TDD Grouping

FIG. 5 illustrates a first embodiment of TDD grouping in an adaptive TDD system. In the first embodiment, downlink-to-uplink switch-point periodicity with 10 ms form a TDD group (TDD Group #1-1 as depicted by table 501), where subframes SF#0, 1, 2, 5, 6, 7, 8, and 9 are common subframes. Downlink-to-uplink switch-point periodicity with 5 ms form another TDD group (TDD Group #1-2 as depicted by table 502), where subframes SF#0, 1, 2, 5, 6, and 7 are common subframes. By grouping different TDD configurations based on downlink-to-uplink switch-point periodicity, more common-subframes are obtained within the same TDD group to serve legacy UEs.

FIG. 6 illustrates a second embodiment of TDD grouping in an adaptive TDD system. In the second embodiment, downlink-to-uplink switch-point periodicity with 10 ms form a TDD group (TDD Group #2-1 as depicted by table 601), where subframes SF#0, 1, 2, 5, 6, 7, 8, and 9 are common subframes. Downlink-to-uplink switch-point periodicity with 5 ms, excluding TDD configuration #0, form another TDD group (TDD Group #2-2 as depicted by table 602), where subframes SF#0, 1, 2, 5, 6, 7, 8, and 9 are common subframes. TDD configuration #0 forms its own TDD group (TDD Group#2-3 as depicted by table 603), where all subframes can be used to serve legacy UEs and new released UEs. It can be seen that, by separating TDD configuration #0, more common-subframes are obtained for TDD Group #2-2 as compared to TDD Group #1-2.

Figures 7, 8:
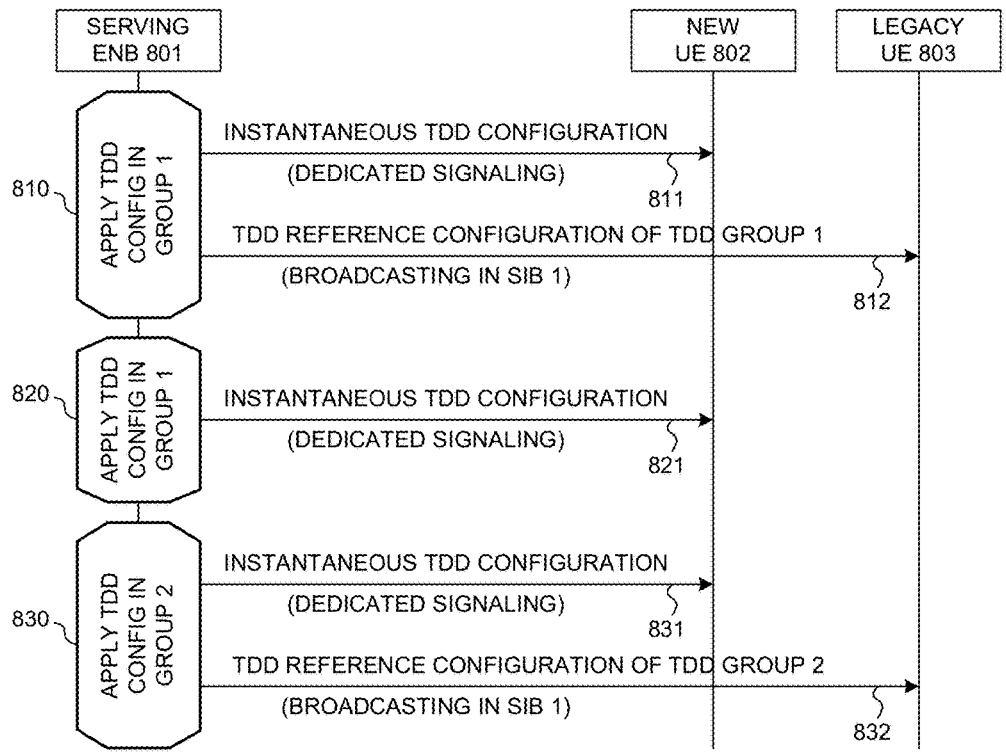
FIG. 7 illustrates a third embodiment of TDD grouping in an adaptive TDD system.
FIG. 8 illustrates a solution of broadcasting TDD grouping and TDD configuration change procedure.

FIG. 7 illustrates a third embodiment of TDD grouping in an adaptive TDD system. In the third embodiment, all seven TDD configurations #0 to #6 are grouped into one single TDD group (TDD Group #3-1 as depicted by table 701), where subframes SF#0, 1, 2 and 5 are common subframes. This is an extreme case where the common subframes of the TDD group are the same with or without TDD grouping.

In general, with TDD grouping, more common-subframes can be obtained in a TDD group as compared to without TDD grouping. As a result, more subframes can be used to serve legacy UEs. In addition, fewer subframes may change when TDD configurations are adapted within the same TDD group, which may be beneficial to HARQ process continuation during the TDD adaptation. Furthermore, TDD operations in TDD groups may help interference coordination among neighboring cells. In order to achieve the above benefits, the TDD grouping information needs to be communicated from the network to the UEs.

FIG. 8 illustrates a solution of broadcasting TDD grouping and TDD configuration change procedure. A serving base station eNB 801 first determines TDD grouping, which contains two TDD groups—TDD group #1 and TDD group #2. In step 810, eNB 801 applies a first TDD configuration that belongs to TDD group #1. In step 811, eNB 801 sends the first instantaneous TDD configuration to a new released UE 802 via dedicated signaling. In step 812, eNB 801 sends a TDD reference configuration of TDD group #1 via broadcasting in System Information Block (SIB1). The TDD reference configuration belongs to TDD group #1, and contains the most common uplink subframes as compared to all other TDD configurations in TDD group #1. For example, a cell in TDD Group #1-1 should broadcast TDD configuration #3 as its TDD reference configuration, and a cell in TDD Group#1-2 should broadcast TDD configuration #0 as its TDD reference configuration. In a similar example, a cell in TDD Group #2-1, #2-2, or #2-3 can broadcast TDD reference configuration #3, #6, or #0 respectively as its TDD reference configuration.

In step 820, eNB 801 applies a second TDD configuration that belongs to TDD group #1. In step 821, eNB 801 sends the second instantaneous TDD configuration to the new released UE 802 via dedicated signaling. Because the second TDD configuration belongs to the same TDD group #1 broadcasted in SIB1, eNB 801 is able to adaptively change TDD configuration within the same TDD group without changing the reference TDD configuration of TDD group #1 broadcasted in SIB1. Later on, eNB 801 decides to change TDD configuration across TDD groups. If TDD configuration changes across TDD groups, then the TDD reference configuration in SIB1 should first be changed to be the predefined TDD reference configuration of the new TDD group. In other words, system information change procedure should be applied, and then the new TDD configuration across TDD groups can be applied.

In step 830, eNB 801 decides to apply a third TDD configuration that belongs to a different TDD group #2. In step 831, eNB 801 sends the third instantaneous TDD configuration to the new released UE 802 via dedicated signaling. In step 832, eNB 801 sends a TDD reference configuration of TDD group #2 via broadcasting in SIB1. The TDD reference configuration belongs to TDD group #2, and contains the most common uplink subframes as compared to all other TDD configurations in TDD group #2. In one specific example, a cell originally operates in TDD Group #2-1 and broadcasts TDD reference configuration #3 for TDD Group #2-1 in its SIB1. If the cell decides to change to TDD configuration #2 that belongs to TDD Group #2-2, then the cell should first apply system information change procedure to broadcast TDD reference configuration #6 for the new TDD Group #2-2 in its SIB1, and then change to the new TDD configuration #2 accordingly.

Random Access

Because a legacy UE does not know the UL/DL change in the network, it may happen that the legacy UE performs random access in an operating DL subframe because the cognition on DL/UL of a subframe for the legacy UE may be different from the real operation. To prevent the unnecessary preamble transmission from legacy UEs, which may result in random access failure, and to prevent the preamble interfering with DL transmission of new released UEs in an adaptive TDD network, various solutions are proposed. Note that in LTE, TDD configuration is broadcasted in SIB1 and common PRACH resource configuration is broadcasted in SIB2.

Figures 9, 10:
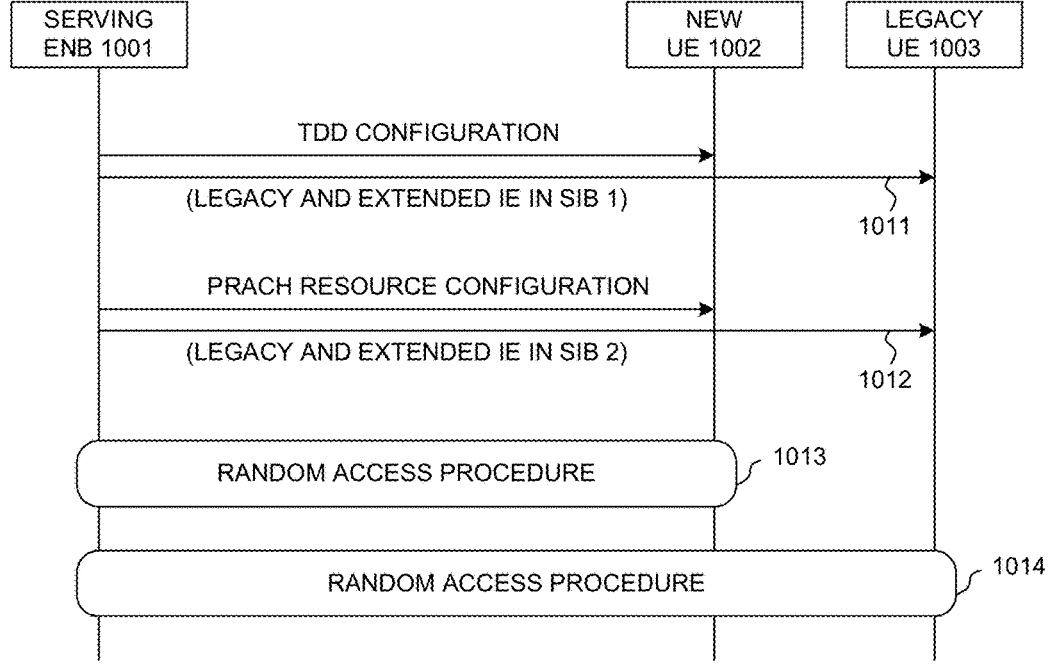
FIG. 9 illustrates one embodiment of RACH resource allocation in an adaptive TDD system.
FIG. 10 illustrates TDD and RACH resource configuration extension in SIB.

FIG. 9 illustrates one embodiment of RACH resource allocation in an adaptive TDD system. In one novel aspect, the random access resource allocation should be restricted to the subframes that are commonly used as UL operation in a TDD group. As illustrated in FIG. 9, for TDD Group #1-1, random access resource can be configured in subframe SF#2 and/or UpPTS in subframe SF#1. For TDD Group #1-2, random access resource can be configured in subframes SF#2, SF#7, and/or UpPTS in subframes SF#1 and SF#6. By restricting random access resource to common UL subframes within a TDD group, RACH preambles are always transmitted in an operating UL subframe.

In another alternative embodiment, the TDD reference configuration broadcasted in SIB1 should be the TDD configurations containing the least common UL subframes in a TDD group. This is to guarantee that random access would not be performed in DL subframes when TDD configuration is changed. The common PRACH resource is configured in the UL subframes of the TDD reference configuration broadcasted in SIB1, and UE performs preamble transmission in theses configured PRACH resource. In one example, a cell in TDD Group #1-1 should broadcast TDD configuration #5 in its SIB1 because TDD configuration #5 is with the least common subframes in TDD Group #1-1, and a cell in TDD Group #1-2 should broadcast TDD configuration #2 in its SIB1 because TDD configuration #2 is with the least common subframes in TDD Group #1-2.

To avoid the PRACH resource limitation, both TDD configuration and RACH resource configuration can be extended in SIB. FIG. 10 illustrates TDD and RACH resource configuration extension in system information. As illustrated in FIG. 10, in step 1011, a serving base station eNB 1001 broadcasts a TDD configuration with the least common UL subframe in the legacy information element (IE) in SIB1 for a legacy UE 1003, and broadcasts another TDD configuration in an extended IE in SIB1 for a new released UE 1002. In step 1012, eNB 1001 broadcasts PRACH resource configuration in the legacy PRACH-config IE in SIB2 for legacy UE 1003, and broadcasts PRACH resource configuration in an extended PRACH-config IE in SIB2 for new released UE 1002. For example, a cell in TDD Group #1-1 may broadcast TDD configuration #5 in the legacy IE and may broadcast TDD configuration #3 in an extended IE in SIB1. The PRACH resource configuration can be extended in SIB2 accordingly. The PRACH resource configuration in SIB2 should indicate the PRACH resource for TDD configuration #5 in the legacy IE and indicate the PRACH resource for TDD configuration #3 in the extended IE. In step 1013, new released UE 1002 performs random access in the PRACH resource allocated according to the PRACH configuration in the extended PRACH-config IE. In step 1014, legacy UE 1003 performs random access in the PRACH resource allocated according to the PRACH configuration in the legacy PRACH-config IE. By using both legacy and extended SIB1 and SIB2, PRACH resource configuration is not limited for legacy UEs.

Data Transmission and HARQ Process

After random access is successfully performed by a UE, an RRC connection between the UE and its serving eNB is established. As stated earlier, the knowledge of TDD configuration for a legacy UE may not be the same as the exact TDD operation in an adaptive TDD system. For example, a legacy UE may reply HARQ for DL data transmission in an operating DL subframe, while the eNB will not expect HARQ for DL data transmission in a DL subframe and will not receive this HARQ message so that DL retransmissions may happen. As to UL transmission, a legacy UE may perform UL data transmission in an operating DL subframe, while the eNB will not expect to receive the UL data so UL retransmission may happen. In addition, a UE may expect HARQ for UL data transmission in a DL subframe. However, when the TDD configuration changes, the original DL subframe which is expected to transmit the HARQ for UL data transmission may become a UL subframe. As a result, the HARQ message will not be transmitted by the eNB and will not be received by the UE so UL retransmission may happen. The UL transmission or retransmission may also interfere the DL reception of nearby UEs. Therefore, DL/UL Data transmission and the associated HARQ should be considered for the operation of legacy UEs without changing any specification.

After a serving eNB establishes an RRC connection with a UE, the eNB can enquiry UE capability to know the UE's release. If the UE's release version is known by the eNB, then the eNB can prevent scheduling DL/UL data transmission and/or HARQ for DL/UL data transmission in the inconsistent subframes (flexible subframes), where the inconsistent subframe means the legacy UE's cognition on DL/UL operation in a subframe is different from the real operation. The following discussions assume that SIB1 broadcasts predefined TDD reference configuration with the MOST COMMON UL subframes in a TDD group, and the TDD reference configuration is recognized by legacy UEs as the operating TDD configuration.

Figures 11A, 11B:
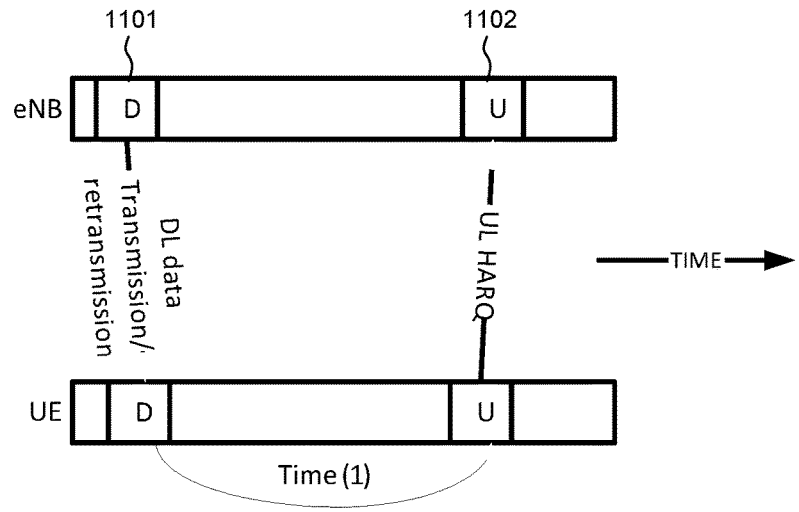
FIG. 11A illustrates Downlink data transmission scheduling and HARQ for DL transmission.
FIG. 11B illustrates HARQ timing with DL association set index for TDD.

FIG. 11A illustrates Downlink data transmission scheduling and HARQ for DL transmission. As illustrated in FIG. 11A, an eNB first schedules DL data transmission or retransmission in a DL subframe 1101 to a UE. The UE should response with HARQ for the DL data transmission in a corresponding UL subframe 1102. The HARQ timing is depicted by Table 1110 (e.g., 10.1.3.1-1 in TS 36.213) in FIG. 11B. Table 1110 lists, for each TDD configuration, a specific UL subframe is used for HARQ for corresponding DL data transmission that is K subframes ahead of the specific UL subframe. For example, in TDD configuration #0, UL subframe SF#2 is used for HARQ for K=6 subframes ahead of SF#2 (e.g., DL SF#5). After combining TDD configuration with HARQ timing for DL data transmission, it can be determined that the HARQ ACK/NACK for a DL subframe should be replied in which corresponding UL subframe(s) for each TDD configuration.

FIG. 11C illustrates one embodiment of DL data transmission in an adaptive TDD system. In TDD Group #1-1, the knowledge of TDD configuration for a legacy UE should be TDD configuration #3. However, the eNB may operate in TDD configurations #3, 4, or 5. For a legacy UE, to prevent invalid HARQ feedback in inconsistent subframes, the eNB should schedule DL data transmission/retransmission in a DL subframe where its HARQ feedback for DL data transmission should be transmitted in a common UL subframe. On the other hand, for a new released UE, the DL data can be scheduled in any DL subframe. Note that common UL subframes for all TDD configurations in each TDD group are indicated by bold text and dashed lines.

As depicted by Table 1120 in FIG. 11C, in Group #1-1, the TDD configuration for legacy UEs is TDD configuration #3. In this case, eNB should prevent DL data transmission or retransmission scheduling in subframes SF#0, 7, 8, and 9 (e.g., crossed out in Table 1120) for a legacy UE. Instead, the eNB can schedule DL data transmission or retransmission in subframes SF #1, 5, 6 for the legacy UE and the legacy UE should response the corresponding HARQ in common UL subframes SF#2. As depicted by Table 1130 in FIG. 11C, in TDD Group #1-2, the TDD configuration for legacy UEs is TDD configuration #0. In this case, eNB should prevent DL data transmission or retransmission scheduling in subframes SF#0 and 5 (e.g., crossed out in Table 1130) for a legacy UE. Instead, the eNB can schedule DL data transmission or retransmission in subframes SF#1 and 6 for the legacy UE and the legacy UE should response the corresponding HARQ in common UL subframes SF#7 and 2, respectively.

FIG. 11D illustrates another embodiment of DL data transmission in an adaptive TDD system. Similar concept can be applied in the TDD Groups #2-2 and #2-3. As depicted by Table 1140 in FIG. 11D, in TDD Group #2-2, the TDD configuration to legacy UEs is TDD configuration #6. In this case, eNB should prevent DL data transmission or retransmission scheduled in subframes SF#1, 6, and 9 (e.g., crossed out in Table 1140) for a legacy UE. Instead, the eNB can schedule DL data transmission or retransmission in subframes SF#0 and 5 for the legacy and the legacy UE should response the corresponding HARQ in UL subframes SF#7 and 2, respectively. As depicted by Table 1150 in FIG. 11D, in TDD Group #2-3, since there is only one TDD configuration in this group, the operation for legacy UEs and new released UEs should be the same for DL transmission/retransmission.

Figures 12A, 12B:
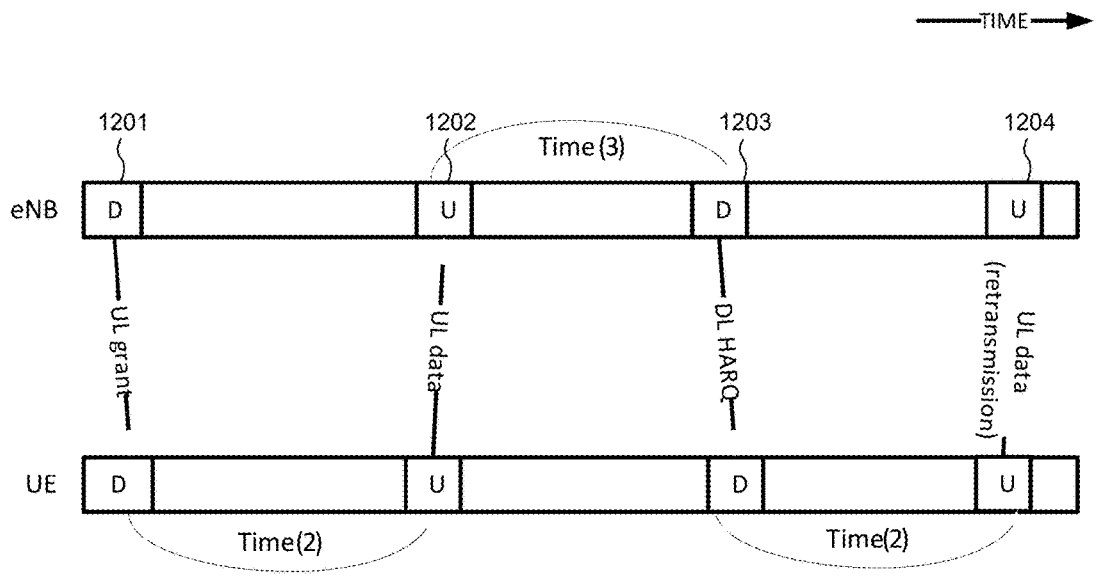
FIG. 12A illustrates Uplink data transmission scheduling and HARQ for UL transmission.
FIG. 12B illustrates Uplink grant timing for UL transmission or retransmission.

FIG. 12A illustrates Uplink data transmission scheduling and HARQ for UL transmission. As illustrated in FIG. 12A, an eNB first assigns a UL grant in a DL subframe 1201 to a UE. The UE performs UL data transmission in the assigned UL resource in UL subframe 1202, and then the eNB replies HARQ feedback for the UL data transmission in a corresponding DL subframe 1203. The UL grant timing is listed in Table 1210 in FIG. 12B (e.g., Table 8-2 in 36.213). Table 1210 lists, for each TDD configuration, if a UE receives a UL grant in DL subframe n, then the UL resource should be in subframe n+k. For example, in TDD configuration #0, if a UE receives a UL grant in subframe SF#0, then the associated UL resource is in subframe SF#4. By combing TDD configuration and UL grant timing, it can be determined a specific DL subframe to be used to assign a UL grant for uplink data transmission in a specific UL subframe. For example, in TDD configuration #3, DL subframe SF#9 may assign UL grant for UL transmission in uplink SF#3.

In one novel aspect, for a legacy UE, to prevent its UL transmission interfering other UE's DL operation, eNB should allocate UL grant in a DL subframe where the UL data should be transmitted in a common UL subframe. For newly release UE, the UL grant can be allocated in any DL subframe.

FIG. 12C illustrates one embodiment of UL data transmission scheduling in an adaptive TDD system. In TDD Group #1-1, an eNB should prevent allocating UL grant in DL subframes SF#0 and 9 for a legacy UE, where the corresponding UL transmissions are in subframes SF#4 and 3, respectively. Instead, the eNB can allocate UL grant in subframe SF#8 for the legacy UE, where the corresponding UL transmission should be transmitted in UL subframe SF#2, as depicted by Table 1220. Similarly, in TDD Group #1-2, the eNB should prevent UL grant in DL subframes SF#0 and 5 for a legacy UE, where the corresponding UL transmissions are in subframes SF#4 and 9, respectively. Instead, the eNB can allocate UL grant in DL subframes SF#1 and 6 for the legacy UE, where the corresponding UL transmission should be transmitted in UL subframes SF#7 and 2, respectively, as depicted by Table 1230.

FIG. 12D illustrates another embodiment of UL data transmission scheduling in an adaptive TDD system. Similar concept can be applied in TDD Groups #2-2 and 2-3. In TDD Group #2-2, the TDD configuration for legacy UEs is TDD configuration #6. An eNB should prevent UL grant in DL subframes SF#1, 6 and 9 for a legacy UE, where the corresponding UL transmissions are in subframes SF#8, 3 and 4, respectively. Instead, the eNB can allocate UL grant in DL subframes SF#0 and 5 for the legacy UE, where the corresponding UL transmission should be transmitted in UL subframes SF#7 and 2, respectively, as depicted by Table 1240. In TDD Group #2-3, since there is only one TDD configuration in this group, the operation for legacy UEs and new released UEs should be the same, as depicted by Table 1250.

FIG. 13A illustrates the timing of HARQ for UL data transmission, as indicated in table 1310 (Table 9.1.2-1 in TS 36.213). HARQ feedback for UL data transmission should be transmitted in DL subframes. For a legacy UE, eNB should prevent the DL subframes used to transmit HARQ for UL data transmission may become operating UL subframes. Fortunately, the legacy UEs operated in the TDD reference configuration with less common DL subframes in a TDD group. These common DL subframes, which may use transmit HARQ for UL data transmission for legacy UEs, will not be operated as UL subframes. Table 1310 lists the HARQ timing for UL data transmission. If a UL data transmission happens in subframe n, then the HARQ associated to the UL data transmission should be in subframe n+k, where k is the number indicated in the table. For example, in TDD configuration #1, the HARQ feedback for subframe SF#2 (n=2) is in the following DL subframe SF#6 (k=4).

FIG. 13B illustrates a first embodiment of HARQ scheduling for UL data transmission in an adaptive TDD system. In TDD Group #1-1, the HARQ feedback for UL data transmission for UL subframe SF#2 should be transmitted in DL subframe SF#8, which is a common DL in the TDD Group and will not be changed to UL operation, as shown in Table 1320. In TDD Group #1-2, the HARQ feedback for UL data transmission for UL subframes SF#2 and 7 should be transmitted in the DwPTS in SF#6 and 1, which is a common special subframe in the TDD Group and will not be changed as a UL subframe, as shown in Table 1330. Note that the common DL subframes or common special subframes for all TDD configurations in each TDD group are indicated by bold text and dashed lines.

Figures 13C, 13D:
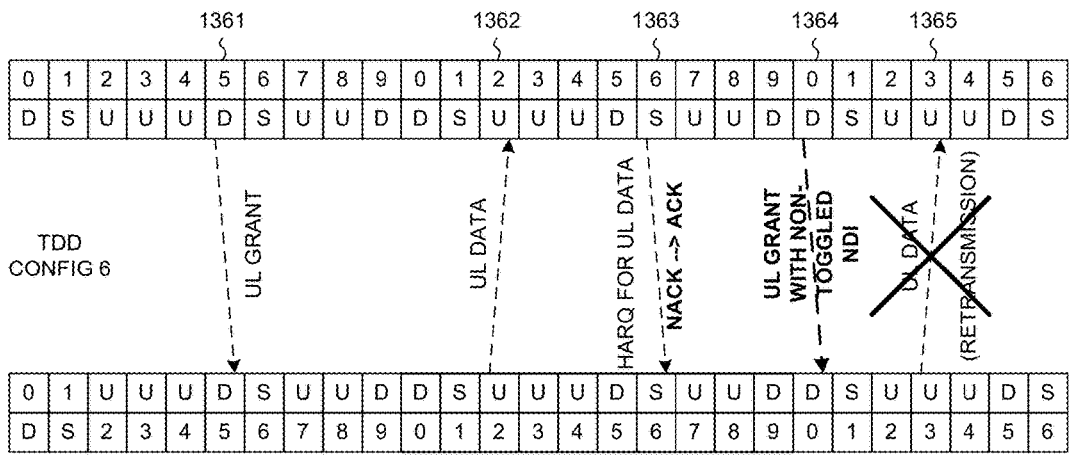
FIG. 13C illustrates another embodiment of HARQ scheduling for UL transmission in an adaptive TDD system.
FIG. 13D illustrates UL data retransmission in an adaptive TDD system.

FIG. 13C illustrates a second embodiment of HARQ scheduling for UL data transmission in an adaptive TDD system. In TDD Group #2-2, the HARQ feedback for UL data transmission for UL subframes SF#2 and 7 should be transmitted in the DwPTS in SF#6 and 1, which is a common special subframe in the TDD Group and will not be changed as a UL subframe, as shown in Table 1340. In TDD Group #2-3, since there is only one TDD configuration in this group, the HARQ feedback operation for legacy UEs and new released UEs should be the same, as shown in Table 1350.

If an HARQ NACK is indicated in the HARQ feedback for UL data transmission, then UL data retransmission is expected. For a legacy UE, similar to the UL data transmission, the UL data retransmission should be transmitted in a common UL subframe. Once the HARQ NACK is indicated in PHICH (Physical Hybrid-ARQ Indicator Channel), the UL data retransmission timing should follow the UL grant table, which is listed by Table 1210 (Table 8-2 in 36.213) in FIG. 12B.

For a legacy UE in TDD Group #1-1 (applying TDD configuration #3), TDD Group #1-2 (applying TDD configuration #0), and TDD Group #2-1 (applying TDD configuration #3), the round trip time (RTT) of the HARQ processes assigned to the legacy UE is 10 msec (e.g., 1 radio frame=10 subframes), which means that a subsequent UL retransmission subframe is the same as the first UL transmission subframe. For TDD Group #2-3, the TDD configuration will not change, the procedure keeps the same as current process.

However, for a legacy UE in TDD Group #2-2 (applying TDD configuration #6), the UL data retransmission subframe is not aligned with the first UL data transmission subframe due to the HARQ RTT is not 10 msec. In this case, the UL data retransmission may happen in an inconsistent subframe. To solve this problem, an eNB may suppress the UL data retransmission.

FIG. 13D illustrates UL data retransmission in an adaptive TDD system in accordance with one novel aspect. In the example of FIG. 13D, a legacy UE applying TDD configuration #6 in Group #2-2, and its eNB assigns a UL grant in DL subframe SF#5 (1361). The UE responses with UL data transmission in a subsequent UL subframe SF#2 (1362). The HARQ feedback for the UL data transmission should be replied in a subsequent DL subframe SF#6 (1363) from eNB to the UE. If a NACK is indicated in PHICH in this case, then the UL retransmission should be carried in UL subframe SF#3 (1365). However, SF#3 is not a common UL subframe and may be changed to be DL operation. A legacy UE may not be allowed to do the UL transmission in this subframe if the current TDD configuration #6 is adapted to a different TDD configuration in TDD Group #2-2.

To solve this problem, eNB can suppress the UL retransmission in SF#3 (1365) by sending an ACK in the previous SF#6 (1363), and assign a UL grant with unchanged NDI (new data indicator) in the next available assignment, for example, assign UL grant in subframe SF#0 (1364) with unchanged NDI for UL retransmission. As a result, the following processes can follow the process of UL data transmission.

Figure 14:
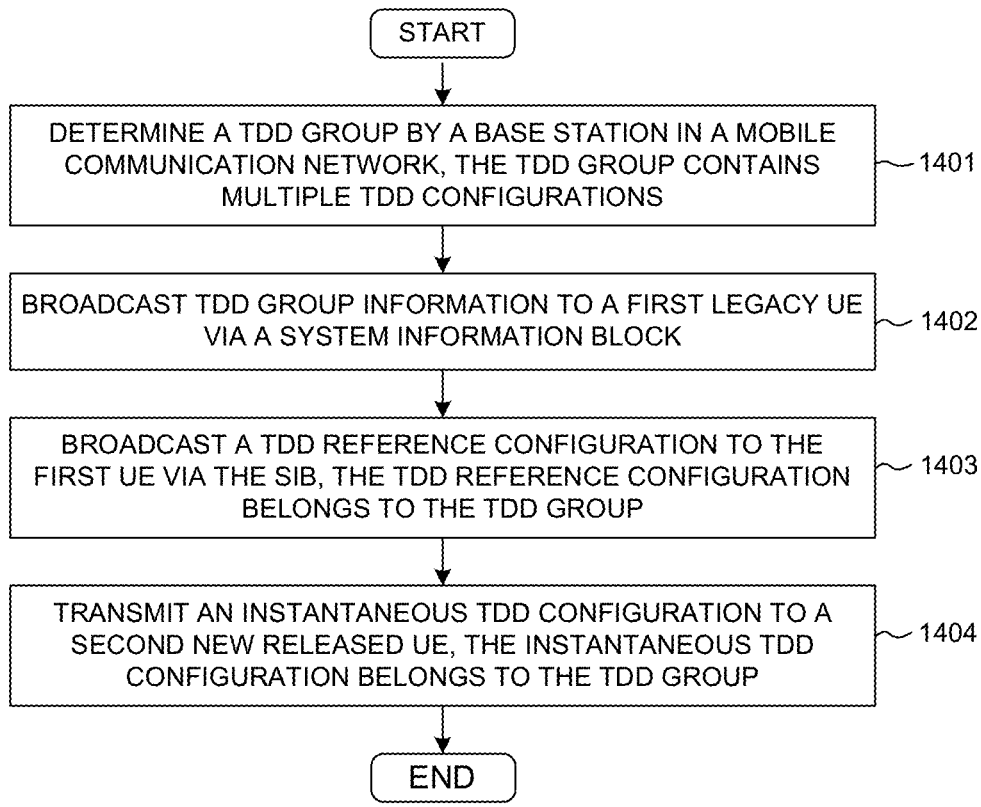
FIG. 14 is a flow chart of a method of adaptive TDD configuration from eNB perspective in accordance with one novel aspect.

FIG. 14 is a flow chart of a method of adaptive TDD configuration in a mobile communication network from eNB perspective in accordance with one novel aspect. In step 1401, an eNB determines a TDD group that contains multiple TDD configuration. In step 1402, the eNB broadcasts TDD group information to a first legacy UE via a system information block (SIB). In step 1403, the eNB broadcasts a TDD reference configuration to the first UE via the SIB, where the TDD reference configuration belongs to the TDD group. In step 1404, the eNB transmits an instantaneous TDD configuration to a second new released UE, where the instantaneous TDD configuration belongs to the TDD group. In one embodiment, the multiple TDD configurations in the TDD group have common subframes no less than subframes #0, #1, #2 and #5, and the TDD reference configuration has the most common uplink (UL) subframes as compared to other TDD configurations in the TDD group.

Figure 15:
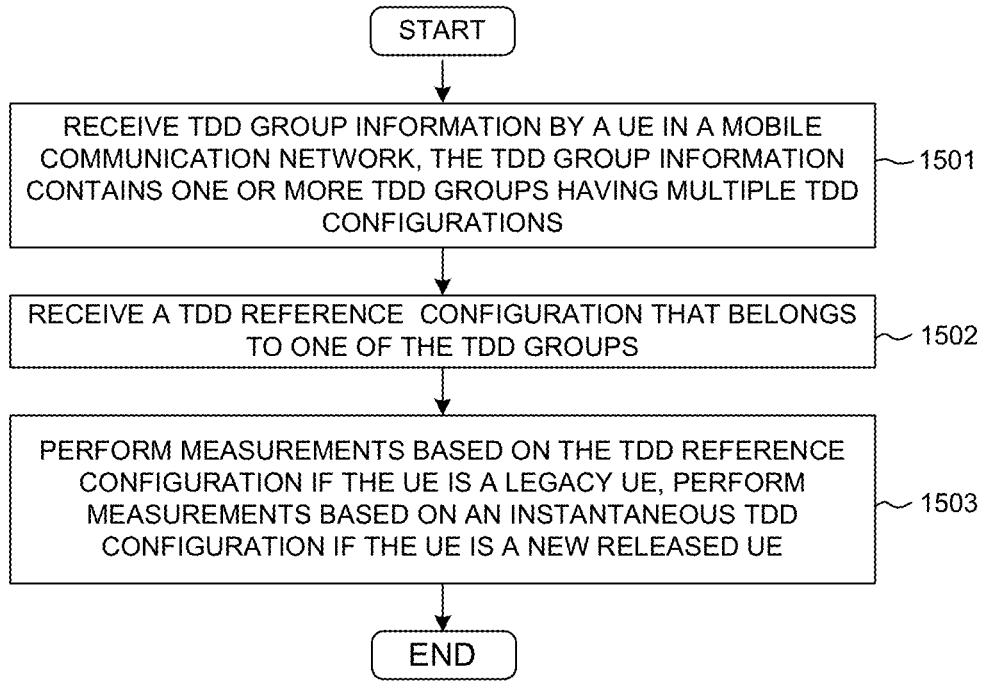
FIG. 15 is a flow chart of a method of adaptive TDD configuration from UE perspective in accordance with one novel aspect.

FIG. 15 is a flow chart of a method of adaptive TDD configuration in a mobile communication network from UE perspective in accordance with one novel aspect. In step 1501, a UE receives TDD group information that contains one or more TDD groups having multiple TDD configuration. In step 1502, the UE receives a TDD reference configuration that belongs to one of the TDD groups. In step 1503, the UE performs measurements on DL subframes based on the TDD reference configuration if the UE is a legacy UE, and performs measurements on DL subframes based on an instantaneous TDD configuration if the UE is a new release UE. In one embodiment, the multiple TDD configurations in the TDD group have common subframes no less than subframes #0, #1, #2 and #5, and the TDD reference configuration has less common downlink (DL) subframes as compared to other TDD configurations in the TDD group.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   determining a time division duplex (TDD) group by a base station in a mobile communication network, wherein the TDD group contains multiple TDD configurations;
   broadcasting a TDD reference configuration of the TDD group to a first UE via a system information block (SIB), wherein the first UE is a legacy UE, the TDD reference configuration belongs to the TDD group, the TDD reference configuration has the most/least common uplink subframes in the TDD group, wherein the TDD reference configuration is taken as a common configuration representing all the TDD configuration of the TDD group, and the TDD reference configuration of the TDD group is recognized by the first UE as an operating TDD configuration; and
   transmitting an instantaneous TDD configuration to a second UE, wherein the instantaneous TDD configuration belongs to the TDD group, wherein the second UE is a new-released UE that supports dynamic TDD adaptation, and wherein the TDD reference configuration does not change with the changes of the instantaneous TDD configuration.

2. The method of claim 1, wherein a radio frame contains ten downlink and uplink subframes #0 to #9, and wherein the multiple TDD configurations in the same TDD group have common subframes no less than subframes #0, #1, #2 and #5.

3. The method of claim 1, further comprising:
   changing to a second instantaneous TDD configuration within the same TDD group without changing the TDD reference configuration.

4. The method of claim 1, further comprising:
   broadcasting a second TDD reference configuration to the first UE via the SIB, wherein the second TDD reference configuration belongs to a second TDD group; and
   changing to a second instantaneous TDD configuration that belongs to the second TDD group.

5. The method of claim 1, further comprising:
   allocating random access resource in a specific UL subframe for the first UE, wherein the specific UL subframe is a common UL subframe to all multiple TDD configurations in the TDD group.

6. The method of claim 1, wherein a legacy information element (IE) in the SIB is used to broadcast the TDD reference configuration for legacy UEs.

7. The method of claim 1, wherein a legacy random access resource configuration information element (IE) is used for legacy UEs, and wherein an extended random access configuration IE is used for new-released UEs.

8. The method of claim 1, further comprising:
   scheduling downlink (DL) data transmission in a DL subframe such that a corresponding hybrid automatic repeat request (HARQ) feedback for the DL data transmission is transmitted in a common UL subframe of the TDD group.

9. The method of claim 1, further comprising:
   allocating an UL grant in a DL subframe for UL data transmission such that UL data is transmitted in a common UL subframe of the TDD group.

10. The method of claim 1, further comprising:
    scheduling UL data transmission in a UL subframe such that a corresponding hybrid automatic repeat request (HARQ) feedback for the UL data transmission is transmitted in a common DL subframe.

11. The method of claim 10, further comprising:
    suppressing UL retransmission if the UL retransmission may happen in an inconsistent subframe.

12. A method comprising:
    receiving a TDD reference configuration of a TDD group by a user equipment (UE), wherein the TDD group contains multiple TDD configurations and the TDD reference configuration belongs to the TDD group and the TDD reference configuration has the most/least common uplink subframes in the TDD group, wherein the TDD reference configuration is taken as a common configuration representing all the TDD configuration of the TDD group; and
    performing measurements based on the TDD reference configuration of the TDD group if the UE is a legacy UE, wherein the TDD reference configuration of the TDD group is recognized by the UE as an operating TDD configuration, wherein the UE performs measurements based on an instantaneous TDD configuration if the UE is a new-released UE that supports dynamic TDD adaptation, wherein the TDD reference configuration does not change with the changes of the instantaneous TDD configuration.

13. The method of claim 12, wherein a radio frame contains ten downlink and uplink subframes #0 to #9, and wherein the multiple TDD configurations in the same TDD group have common subframes no less than subframes #0, #1, #2 and #5.

14. The method of claim 12, wherein the UE obtains the TDD reference configuration from a legacy information element (IE) in a system information block (SIB) if the UE is the legacy UE.

15. The method of claim 12, wherein the UE reads a legacy random access resource configuration information element (IE) for random access if the UE is the legacy UE, and wherein the UE reads an extended random access configuration IE for random access if the UE is the new-released UE.

16. A user equipment (UE) comprising:
    a receiver that receives a TDD reference configuration of a TDD group, wherein the TDD group contains multiple TDD configurations and the TDD reference configuration belongs to the TDD group and the TDD reference configuration has the most/least common uplink subframes in the TDD group, wherein the TDD reference configuration is taken as a common configuration representing all the TDD configuration of the TDD group; and
    a measurement module that performs measurements based on the TDD reference configuration of the TDD group if the UE is a legacy UE, wherein the TDD reference configuration of the TDD group is recognized by the UE as an operating TDD configuration, wherein the measurement module performs measurements based on an instantaneous TDD configuration if the UE is a new-released UE that supports dynamic TDD adaptation, wherein the TDD reference configuration does not change with the changes of the instantaneous TDD configuration.

17. The UE of claim 16, wherein a radio frame contains ten downlink and uplink subframes #0 to #9, and wherein the multiple TDD configurations in the same TDD group no less than common subframes than subframes #0, #1, #2 and #.

18. The UE of claim 16, wherein the UE obtains the TDD reference configuration from a legacy information element (IE) in a system information block (SIB) if the UE is the legacy UE.

19. The UE of claim 16, wherein the UE reads a legacy random access resource configuration information element (IE) for random access if the UE is the legacy UE, and wherein the UE reads an extended random access configuration IE for random access if the UE is the new-released UE.

\* \* \* \* \*

UNITED STATES PATENT AND TRADEMARK OFFICE
CERTIFICATE OF CORRECTION

PATENT NO. : 9,794,803 B2  
APPLICATION NO. : 14/157212  
DATED : October 17, 2017  
INVENTOR(S) : Shiang-Jiun Lin et al.

Page 1 of 1

It is certified that error appears in the above-identified patent and that said Letters Patent is hereby corrected as shown below:

In the Claims

Column 14, Lines 63 should now read:
"and #5."

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*